(12) United States Patent
Wolfram et al.

(10) Patent No.: US 10,346,681 B2
(45) Date of Patent: Jul. 9, 2019

(54) METHOD AND COMPUTING DEVICE FOR OPTICALLY RECOGNIZING MATHEMATICAL EXPRESSIONS

(71) Applicant: Wolfram Research, Inc., Champaign, IL (US)

(72) Inventors: Christopher Wolfram, Concord, MA (US); Etienne P. Bernard, Somerville, MA (US)

(73) Assignee: Wolfram Research, Inc., Champaign, IL (US)

( * ) Notice: Subject to any disclaimer, the term of this patent is extended or adjusted under 35 U.S.C. 154(b) by 108 days.

(21) Appl. No.: 15/276,564

(22) Filed: Sep. 26, 2016

(65) Prior Publication Data

US 2017/0091597 A1 Mar. 30, 2017

Related U.S. Application Data

(60) Provisional application No. 62/233,331, filed on Sep. 26, 2015.

(51) Int. Cl.
| G06K 9/00 | (2006.01) |
| G06N 3/04 | (2006.01) |
| G06K 9/46 | (2006.01) |

(52) U.S. Cl.
CPC ....... *G06K 9/00442* (2013.01); *G06K 9/4628* (2013.01); *G06K 2209/01* (2013.01); *G06N 3/0445* (2013.01); *G06N 3/0454* (2013.01)

(58) Field of Classification Search
CPC .............................. G06F 7/64; G06K 9/00442
USPC .......................................................... 382/229
See application file for complete search history.

(56) References Cited

U.S. PATENT DOCUMENTS

| 8,589,869 | B2 | 11/2013 | Wolfram | |
| 8,601,015 | B1 | 12/2013 | Wolfram et al. | |
| 9,213,768 | B1 | 12/2015 | Wolfram et al. | |
| 2009/0304282 | A1* | 12/2009 | Predovic | G06K 9/00422 382/187 |
| 2009/0304283 | A1* | 12/2009 | Predovic | G06K 9/00436 382/189 |
| 2010/0074527 | A1* | 3/2010 | Vukosavljevic | G06F 17/215 382/187 |
| 2012/0162107 | A1* | 6/2012 | Yoshizawa | G06F 3/04883 345/173 |
| 2013/0054649 | A1* | 2/2013 | Potapov | G06F 17/30436 707/792 |
| 2013/0185663 | A1 | 7/2013 | Wolfram et al. | |
| 2014/0152576 | A1* | 6/2014 | Kim | G06F 3/03545 345/169 |
| 2016/0314348 | A1* | 10/2016 | Wang | G06K 9/00442 |
| 2017/0039468 | A1* | 2/2017 | Zeiler | G06F 17/30598 |

* cited by examiner

*Primary Examiner* — Justin P. Misleh

(74) *Attorney, Agent, or Firm* — Drinker Biddle & Reath LLP

(57) ABSTRACT

Image data corresponding to an image depicting an equation is received. The image data is processed to identify a plurality of morphological components corresponding to the equation depicted in the image. A computer readable data object is generated using the plurality of morphological components, wherein the computer readable data object is in a defined syntax computable by a computational application.

24 Claims, 6 Drawing Sheets

304 —↘

Simplify the following expression $$\sqrt{x^3-2x^2} + \frac{x}{5x^2}$$

$$\int_{-t}^{t} 3\,x\,dx$$

600, 604, 608, 612, 616, 620

640

METHOD AND COMPUTING DEVICE FOR OPTICALLY RECOGNIZING MATHEMATICAL EXPRESSIONS

CROSS-REFERENCE TO RELATED APPLICATION

The present application claims the benefit of U.S. Provisional Application No. 62/233,331, filed Sep. 26, 2015, entitled "METHOD AND COMPUTING DEVICE FOR OPTICALLY RECOGNIZING MATHEMATICAL EXPRESSIONS," which is incorporated by reference herein in its entirety.

FIELD OF THE DISCLOSURE

The present application relates generally to optical pattern recognition and, more particularly, to optical recognition of mathematical expressions.

BACKGROUND

Optical pattern recognition technology has matured to the point where inexpensive optical character recognition (OCR) software can recognize individual characters of scanned-in text and convert such text to electronic format at rate of a few seconds per page. In some ways, recognizing text is simple compared to other pattern recognition tasks. Text—particularly Romanized text—is linear and has a relatively small set of possible shapes. OCR technology is not as easily applied to mathematical expressions, however. This is in part because mathematical expressions are often not linear. For example, numbers, variables, and operators of a single expression may be located throughout a two-dimensional area of a page. Furthermore, the meaning of a mathematical symbol may depend on its location within an expression. For example, a horizontal line may be a minus sign, a fraction bar, or a mean value. As another example, the number two could be a multiplicand, in an exponent, in a subscript, a limit of an integral, etc.

SUMMARY OF THE DISCLOSURE

In an embodiment, a method for generating a computer readable data object corresponding to an equation depicted in an image includes: receiving, at one or more processors, image data corresponding to an image depicting an equation; processing, at one or more processors, the image data to identify a plurality of morphological components corresponding to the equation depicted in the image; and generating, at one or more processors, the computer readable data object using the plurality of morphological components, wherein the computer readable data object is in a defined syntax computable by a computational application.

In another embodiment, a system comprises: one or more processors; and one or more memories coupled to the one or more processors. The one or more memories store machine readable instructions that, when executed by the one or more processors, cause the one or more processors to: receive image data corresponding to an image depicting an equation; process the image data to identify a plurality of morphological components corresponding to the equation depicted in the image; and generate the computer readable data object using the plurality of morphological components, wherein the computer readable data object is in a defined syntax computable by a computational application.

In yet another embodiment, a computer readable medium, or media, storing machine readable instructions that, when executed by one or more processors, cause the one or more processors to: receive image data corresponding to an image depicting an equation; process the image data to identify a plurality of morphological components corresponding to the equation depicted in the image; and generate the computer readable data object using the plurality of morphological components, wherein the computer readable data object is in a defined syntax computable by a computational application.

In still another embodiment, a system comprises: morphological component identifier configured to process image data to identify a plurality of morphological components corresponding to an equation depicted in an image corresponding to the image data. The system also comprises a data object generator configured to generate a computer readable data object using the plurality of morphological components, wherein the computer readable data object is in a defined syntax computable by a computational application. In some embodiments, the morphological component identifier is configured to generate bounding boxes corresponding to the plurality of morphological components. In some embodiments, the morphological component identifier comprises a neural network. In some embodiments, the data object generator is configured to use heuristics to generate the computer readable data object. In some embodiments, the data object generator comprises a neural network.

DETAILED DESCRIPTION

In some embodiments described below, a computing device recognizes a mathematical expression in an image by heuristically identifying, in image data, morphological components within the expression based on the shape of each component and, in some cases, the location of each component within the expression. In other embodiments described below, a computing device recognizes a mathematical expression in an image using one or more neural networks.

Figure 1:
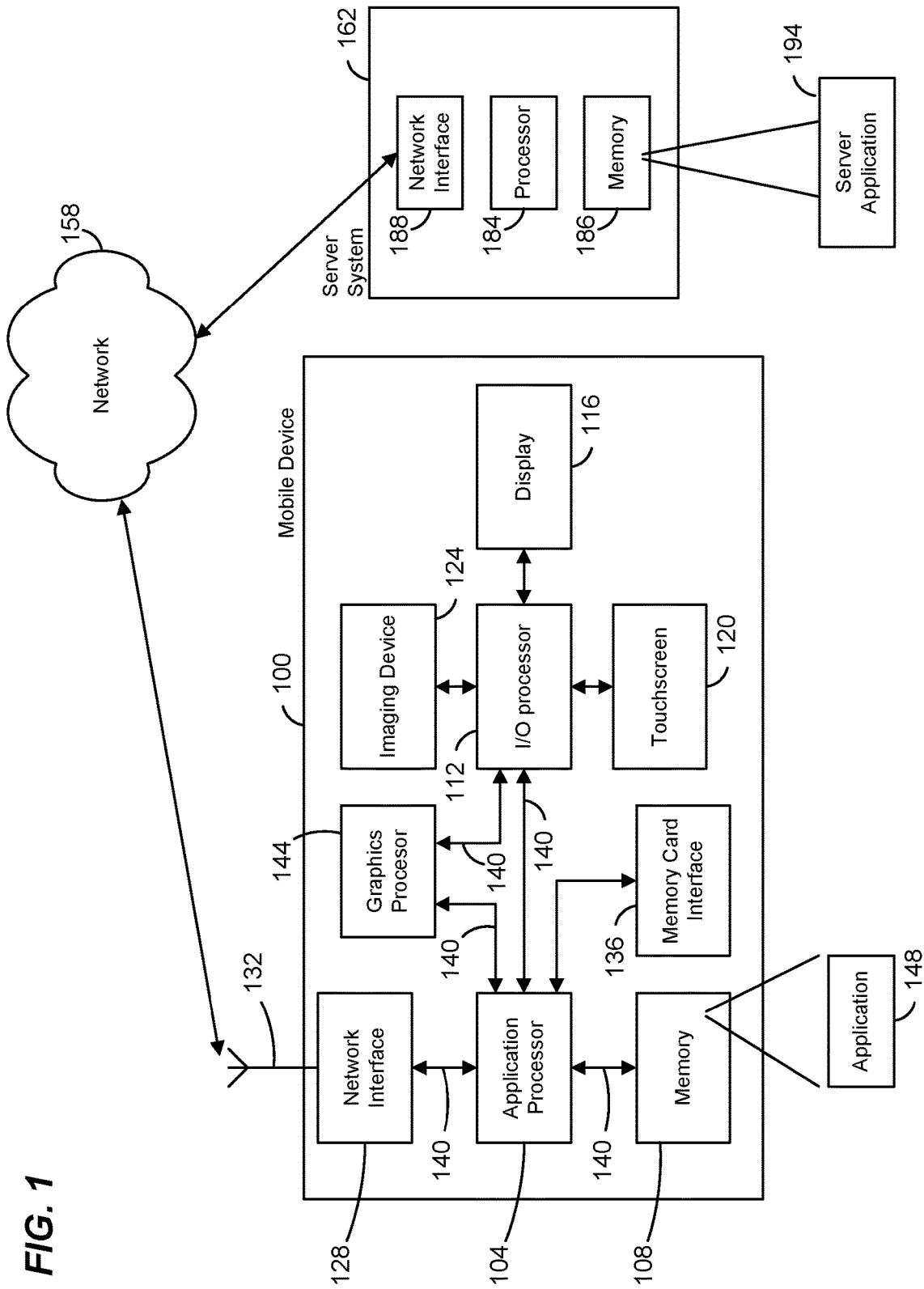
FIG. 1 is a block diagram of an example system configured to implement various techniques described herein, in an embodiment.

FIG. 1 is a diagram of an example system with a mobile computing device 100 ("device 100"), where the system may be configured to carry out one or more methods described herein, according to some embodiments. Possible implementations of the device 100 include a cell phone (e.g., a smartphone), a tablet computer, a personal digital assistant (PDA), etc. The device 100 includes an application processor (AP) 104 coupled to a memory 108. Possible implementations of the memory 108 include one or more computer readable storage media such as random access memory (RAM), read only memory (ROM), FLASH memory, hard drive, or optical drive. The device 100 also includes an input/output (I/O) processor 112 that interfaces the AP 104 with a display device 116 and a touch-sensitive device or touchscreen 120 (e.g., a single-touch or multi-touch touchscreen). The I/O processor 112 also interfaces an imaging device 124 to the AP 104. Possible implementations of the imaging device 124 include a camera and a scanner. The I/O processor 112 may also interface other devices to the AP 104, such as one or more buttons, click wheels, a keyboard, a keypad, a touch pad, another touchscreen (single-touch or multi-touch), lights, a speaker, a microphone, etc.

A network interface 128 is coupled to the AP 104 and to one or more antennas 132. A memory card interface 136 is coupled to the AP 104. The memory card interface 136 is adapted to receive a memory card such as a secure digital (SD) card, a miniSD card, a microSD card, a Secure Digital High Capacity (SDHC) card, etc., or any suitable card.

The AP 104, the memory 108, the I/O processor 112, the network interface 128, and the memory card interface 136 are coupled to one or more busses 140. For example, the AP 104, the memory 108, the I/O processor 112, the network interface 128, and the memory card interface 136 are coupled to a single bus 140, in an embodiment. In another embodiment, the AP 104 and the memory 108 are coupled to a first bus, and the AP 104, the I/O processor 112, the network interface 128, and the memory card interface 136 are coupled to a second bus. In other embodiments, more than two busses are utilized.

The device 100 also may include a graphics processor 144 coupled to the display 116 and to the AP 104. The graphics processor 144 may be coupled to the display 116 via the I/O processor 112. The graphics processor 144 may be coupled to the AP 104 and the I/O processor 112 via one or more busses 140.

The device 100 is only one example of a mobile computing device 100, and other suitable devices can have more or fewer components than shown, can combine two or more components, or a can have a different configuration or arrangement of the components. In some embodiments, the device 100 is communicatively coupled to a network 158, and interacts with a server system 162. Embodiments of the network 158 and the server system 162 will be discussed below in conjunction with FIG. 2.

The various components shown in FIG. 1 can be implemented in hardware, a processor executing software or firmware instructions or a combination of both hardware and a processor executing software or firmware instructions, including one or more signal processing and/or application specific integrated circuits.

The AP 104 executes computer readable instructions stored in the memory 108. The I/O processor 112 interfaces the AP 104 with input and/or output devices, such as the display 116, the touchscreen 120, and other input/control devices. Similarly, the graphics processor 144 executes computer readable instructions stored in the memory 108 or another memory (not shown) associated with the graphics processor 144. The I/O processor 112 interfaces the graphics processor 144 with the display 116 and, optionally other input/control devices.

The I/O processor 112 can include a display controller (not shown) and a touchscreen controller (not shown). The touchscreen 120 includes one or more of a touch-sensitive surface and a sensor or set of sensors that accepts input from the user based on haptic and/or tactile contact. The touchscreen 120 utilizes one or more of currently known or later developed touch sensing technologies, including one or more of capacitive, resistive, infrared, and surface acoustic wave technologies, as well as other proximity sensor arrays or other elements for determining one or more points of contact with the touchscreen 120. The touchscreen 120 and the I/O processor 112 (along with any associated modules and/or sets of instructions stored in memory 108 and executed by the AP 104) can detect one or more points of or instances of contact (and any movement or breaking of the contact(s)) on the touchscreen 120, in some embodiments. Such detected contact can be converted by the AP 104 into interaction with a user-interface mechanism that is displayed on the display 116. A user can make contact with the touchscreen 120 using any suitable object or appendage, such as a stylus, a finger, etc.

The network interface 128 facilitates communication with a wireless communication network such as a mobile communications network, a wireless local area network (WLAN), a wide area network (WAN), a metropolitan area network (MAN), a personal area network (PAN), etc., via the one or more antennas 132. In other embodiments, one or more different and/or additional network interfaces facilitate wired communication with one or more of a local area network (LAN), a WAN, a MAN, another computing device such as a personal computer, a server, etc.

Software components or modules (i.e., sets of computer readable instructions executable by the AP 104) are stored in the memory 108 and/or a separate memory (not shown) associated with the graphics processor 144. The software components can include an operating system, a communication module, a contact module, a graphics module, and applications such as a computational application, a data processing application, a software code editor, etc. The computational application may be an application such as Mathematica® by Wolfram Research, Inc., a spreadsheet application, etc., according to some embodiments. The computational application is capable of evaluating software code, in some embodiments. The computational application is capable of evaluating software code in a symbolic programming language, in some embodiments. The symbolic programming language, in some embodiments, is the Wolfram Language™ or another suitable symbolic programming language.

The operating system can include various software components and/or drivers for controlling and managing general system tasks (e.g., memory management, etc.) and can facilitate communication between various hardware and software components. The communication module can facilitate communication with other devices via the network interface 128.

The contact module can detect contact with the touchscreen 120 (in conjunction with the I/O processor 112). The contact module can include various software components for performing various operations related to detection of contact, such as determining if contact has occurred, determining if there is movement of the contact and tracking the movement across the touchscreen 120 (in some embodiments), and determining if the contact has been broken (i.e., if the contact has ceased). Determining movement of the point of contact can include determining speed (magnitude), velocity (magnitude and direction), and/or an acceleration (a change in magnitude and/or direction) of the point of contact. These operations can be applied to single contacts (e.g., one finger contacts) or to multiple simultaneous contacts (e.g., "multi-touch"/multiple finger contacts), in some embodiments.

The graphics module can include various suitable software components for rendering and displaying graphics objects on the display 116. As used herein, the term "graphics" includes any object that can be displayed to a user, including without limitation text, web pages, icons, symbols, digital images, etc.

An application module 148 includes machine-readable instructions that, when executed by one or more processors (such as the AP 104 and/or the graphics processor 144), cause the one or more processors carry out one or more methods described herein. In some embodiments, the application module 148 is included in the computational application discussed above.

In embodiments in which the AP 104 executes at least portions of the application module 148, the application module 148 may be stored in the memory 108. In embodiments in which the graphics processor 144 executes at least portions of the application module 148, the application module 148 may be stored in the memory 108 and/or in another memory (not shown) of or coupled to the graphics processor 144. In some embodiments, the memory 108 is coupled to the graphics processor 144.

In various examples and embodiments described below, displays and user interfaces are described with reference to the device 100 of FIG. 1 for ease of explanation. In other embodiments, another suitable device different than the device 100 is utilized to display displays and user interfaces. For example, other suitable devices include laptop computers, desktop computers, servers, gaming systems, etc. Such other suitable devices may have a basic structure generally similar to the device 100 of FIG. 1.

Figure 2:
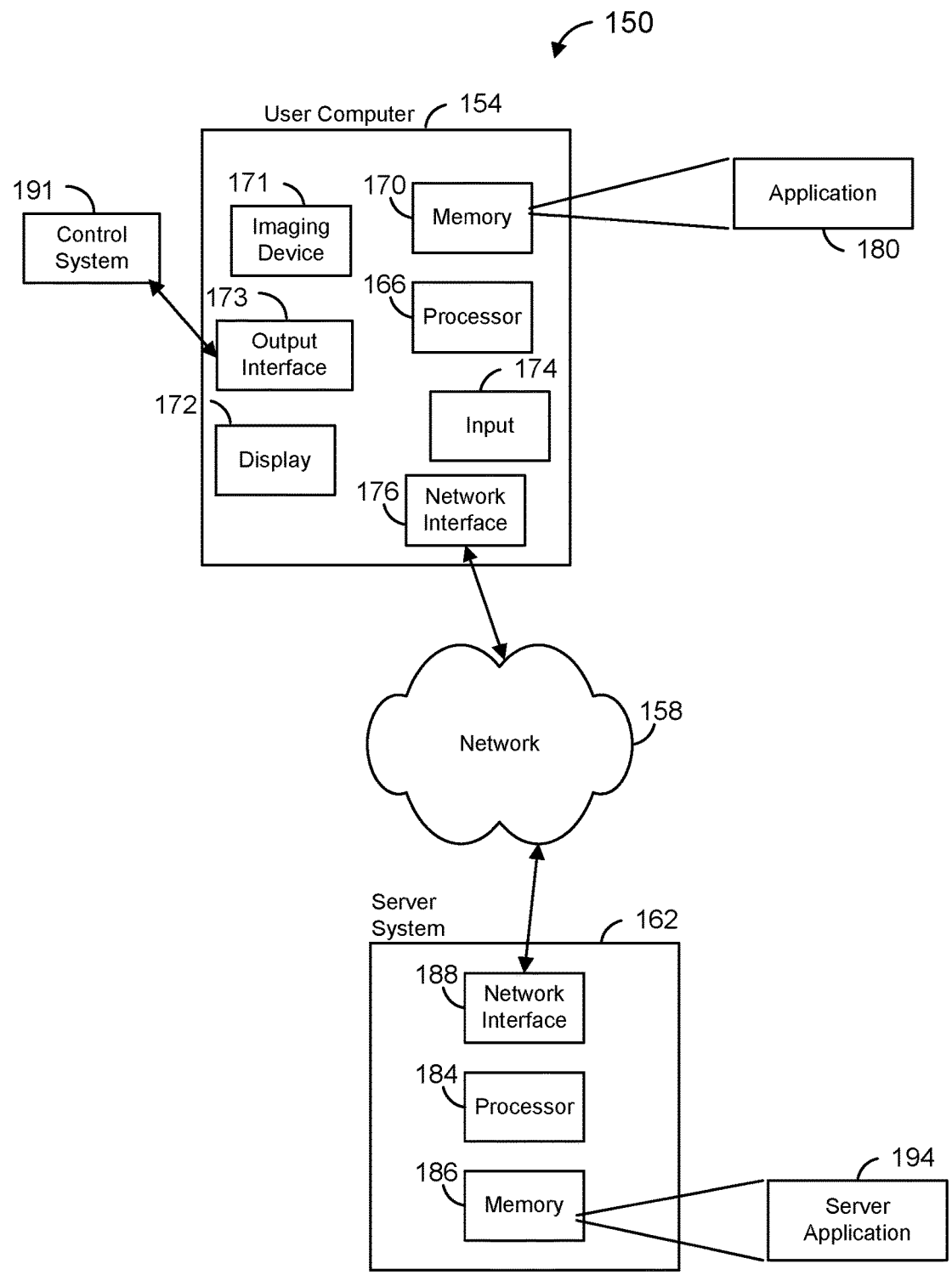
FIG. 2 is a block diagram of an example system configured to implement various techniques described herein, in an embodiment.

FIG. 2 is a diagram of another example system 150 which may carry out one or more of the various techniques described herein, according to some embodiments.

A user computer 154 is configured to implement one or more of the various techniques described herein, in one embodiment, or in conjunction with a server system 162, in another embodiment. In embodiments that include the server system 162, the user computer 154 is communicatively coupled to a communication network 158 including, for example, one or more of the Internet, an intranet, an extranet, a LAN, a WLAN, a MAN, a WAN, a mobile communications network, etc., and the server system 162 is also communicatively coupled to the network 158. In embodiments that include the server system 162, the user computer 154 is configured to communicate with the server system 162 via the network 158.

The user computer 154 may be a computing device such as a desktop computer, a laptop computer, a gaming system, a tablet computer, a smart phone, a PDA, etc. The user computer 154 may include one or more processors 166 (e.g., a central processing unit (CPU) and/or a graphics processor), one more memory devices 170 (e.g., a RAM, a ROM, a FLASH memory, a magnetic disk, an optical disk, etc.), an imaging device 171 (e.g., a camera or scanner) one or more display devices 172 (e.g., integral display device and/or external display device), and one or more input devices 174, such as a keyboard, a keypad, a button, a mouse, a trackball, a touch screen, a multi-touch screen, a touch pad, etc. The user computer 154 may include a network interface 176 to communicatively couple the user computer 154 to the network 158. At least some of the one or more processors 166, the one or more memory devices 170, the one or more display devices 172, the one or more input devices 174, and the network interface 176 may be communicatively coupled together via one or more busses (not shown), cords (not shown), etc.

The one or more memory devices 170 may store all or a portion of an application module 180. The application module 180, when executed by the one or more processors 166, may cause the one or more processors 166 carry out, at least partially, one or more methods described herein. As will be discussed in more detail below, the application module 180 may generate visual display information using information received from the server system 162, in some embodiments in which the server system 162 is included.

In an embodiment, the application module 180 may comprise a front end system that interfaces with a kernel implemented by the server system 162. In this embodiment, the front end system implemented by the user computer 154 may receive user input corresponding to functions commands, instructions, etc., and forward the user input to the server system 162. The kernel implemented on the server system 162 may then execute or interpret the entered functions, commands, instructions, etc., and perform corresponding numerical and/or symbolic calculations to generate corresponding results. The server system 162 may then transmit the results to the user computer 154, and the front end system implemented by the user computer 154 may then display the results in the electronic worksheet, spreadsheet, workbook, etc.

More generally, in some embodiments, the application module 180 may comprise a client-side module that interfaces with a server-side module implemented by the server system 162. In some embodiments, the application module 180 is a web browser. For instance, in one embodiment, the server system 162 may implement a computational application, and a user may utilize the computational application by way of a web browser application 180 implemented by the user computer 154. In this embodiment, the user computer 154 may receive user input corresponding to functions commands, instructions, etc. entered by the user by way of a web page that includes one or more user interface mechanisms for entering input related to a computation to be performed. In other embodiments, a web page corresponds to an electronic worksheet, a spreadsheet, a workbook, etc.

Input entered by the user is forwarded to the server system 162. The computational application implemented on the server system 162 may then execute or interpret the entered functions, commands, instructions, etc., and perform corresponding numerical and/or symbolic calculations to generate corresponding results. The server system 162 may then generate a web page to display the results, in an embodiment. In other embodiments, the server system 162 may generate an updated electronic worksheet, spreadsheet, workbook, etc., that includes the results. The results are transmitted by the server system 162 to the user computer 154. In some embodiments, the results are transmitted by the server system 162 to the user computer 154 as a web page, for example. A web browser implemented by the user computer 154 may then display the results. In some embodiments, a web page corresponds to an updated electronic worksheet, spreadsheet, workbook, etc., that includes the results.

The server system 162 may comprise one or more computing devices such as a desktop computer, a server, a mainframe, etc. The server system 162 may include one or more processors 184, one more memory devices 186 (e.g., RAM, ROM, FLASH memory, a magnetic disk, an optical disk, a database system, etc.), and a network interface 188 to communicatively couple the server system 162 to the network 158. At least some of the one or more processors 184, the one or more memory devices 186, and the network interface 188 may be communicatively coupled together via one or more of 1) one or more busses, 2) one or more networks (e.g., a LAN, a WAN, a MAN, etc.) 3) point-to-point communication links, 4) cords, etc. (not shown).

The one or more memory devices 186 may store a server application 194 that is executed by the one or more processors 184. The server application 194 may comprise a web server application, a computational application, etc., in various embodiments.

In an embodiment, the server application 194 comprises a computational application that, when executed by the one or more processors 194, may perform numerical, graphical, and/or symbolic calculations corresponding to functions, commands, instructions, etc., entered by the user in an electronic worksheet, spreadsheet, workbook, etc. For example, the server application 194 may execute or interpret the functions, commands, instructions, etc., received from the user computer 154, and perform corresponding numerical and/or symbolic calculations to generate corresponding results. In embodiments in which the server system 162 implements a kernel of a computational application, the server application 194 may cause the server system 162 to transmit the results to the user computer 154 via the network 158. In embodiments in which the server system implements a full computational application 194, which the computational application 194 may generate an updated electronic worksheet, spreadsheet, workbook, etc., that includes the results as a web page, for example, and may cause the server system 162 to transmit the web page to the user computer 154 via the network 158.

In an embodiment, the server application 194 includes machine-readable instructions that, when executed by one or more processors (such as the AP 104 and/or the graphics processor 144), cause the one or more processors carry out, at least partially, one or more methods described herein. For example, in some embodiments, the application 180 and the server application 194 may together cause the one or more processors 166/184 to carry out one or more methods described herein.

Referring again to FIG. 1, in some embodiments, the mobile device 100 is communicatively coupled to the server system 162 via the network 158, and the application 148 is configured to interface with the server application 194 in a manner similar to the application 180 of FIG. 2.

In some embodiments, the memory 186 and, optionally, the memory 170 store components of a server-based computational application. The computational application may be an application such as Mathematica® by Wolfram Research, Inc., a spreadsheet application, etc., according to some embodiments. For example, in some embodiments, the memory 186 stores a kernel of the computational application, and the memory 170 stores a front end of the computational application. In some embodiments, the memory 186 and optionally the memory 170 store components of the Wolfram Cloud™ from Wolfram Research, Inc. The computational application is capable of evaluating software code, in some embodiments. The computational application is capable of evaluating software code in a symbolic programming language, in some embodiments. The symbolic programming language, in some embodiments, is the Wolfram Language™ or another suitable symbolic programming language.

In some embodiments, the application module 180 and/or the server application 194 are included in the computational application discussed above.

In some embodiments, apparatuses, systems, and/or techniques such as described herein are utilized to convert an image of a mathematical equation (e.g., a photograph of the equation printed on paper, a scan of the equation printed on paper, etc.) into a computer readable data object or objects, e.g., one or more of software code, a software expression, an expression in a defined syntax of a computational application (e.g., Mathematica®, a spreadsheet application, etc.), etc., representative of the mathematical equation, which allows a computer processor to mathematically evaluate and/or perform mathematical operations on the mathematical equation. In some embodiments, the image is obtained by a taking a photograph of, optically scanning, etc., a paper on which the mathematical equation is printed.

In some embodiments, morphological components in the image are identified, and positions (e.g., absolute and/or relative) of the morphological components are determined. The identified morphological components and the position information are analyzed, and the computer readable data object or objects are generated using the analysis, according to some embodiments. The computational application (e.g., Mathematica® by Wolfram Research, Inc., the Wolfram Cloud®, a spreadsheet application, etc.), a computational knowledge system (e.g., Wolfram Alpha®, etc.), etc., may then be utilized to operate on the computer readable data object or objects to mathematically evaluate the equation and/or to perform mathematical operations on the equation. In some embodiments, the computer readable data object or objects include software programming code in a programming language that the computational application is configured to evaluate. In some embodiments, the programming language is a symbolic programming language.

Figures 3A, 3B:
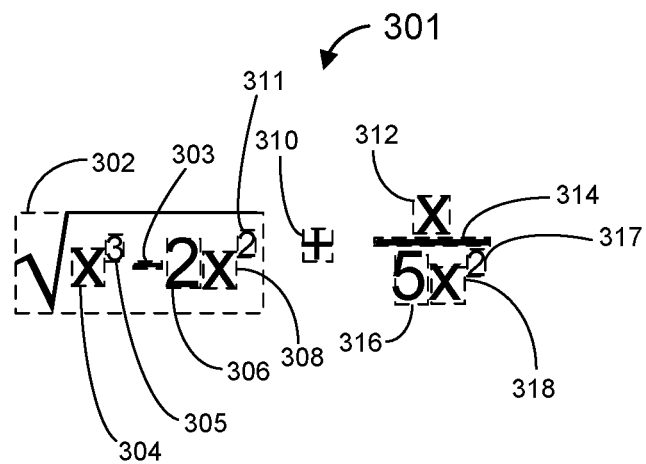
FIG. 3A is an example image that includes both a mathematical expression and a block of text instructions, according to an embodiment.
FIG. 3B illustrates morphological components of the mathematical expression of FIG. 3A being bounded by bounding boxes, according to an embodiment.

FIG. 3A is an example of an image 300 that includes a mathematical expression 301 and a block of text 304, according to an embodiment. To illustrate how the application module 148 or the application module 180 ("application module 148/180"), and/or the server application 194 recognizes the mathematical expression 301 (according to an embodiment) assume that the imaging device 124 or the imaging device 171 captures the image 300. In an embodiment, the application 148/180 carries out one or more preprocessing operations on the image 300 in order to, for example, eliminate artifacts. If the image 300 is not already in a binary form, the one or more preprocessing operations may include converting the image to a binary image.

The application module 148/180 then identifies one or more morphological components of the image 300. According to an embodiment, each set of connected "black" pixels (i.e., a set of "black" pixels in which each black pixel is directly touching or indirectly touching (e.g., via one or more other black pixels that are directly touching each other) each other black pixel) constitutes a morphological component. FIG. 3B shows the various morphological components of the mathematical expression 301. For example, the shape constituting the square root sign is a morphological component, the horizontal line constituting the minus sign is another morphological component, etc.

Then, the application module 148/180 defines a bounding box around each morphological component. In an embodiment, a bounding box is defined as the smallest possible box (square or rectangle) that can contain the morphological component. For example, the application module 148/180 defines a bounding box 302 for the morphological component of the square root symbol, bounding boxes 304, 308, 312 and 318 of the respective instances of the x variable, bounding boxes 305, 306, 311, 316, and 317 for the respective digits, bounding boxes 303 and 310 for the respective arithmetic operators, and a bounding box 314 for the fraction bar.

In an embodiment, the application module 148/180 identifies which symbol (e.g., mathematical operator, letter, or number) each morphological component represents. The application 148/180 then creates a table (e.g., stored within the memory 108 or 170) that maps each morphological component to the symbol that the application module 148/180 has determined the component to represent.

In an embodiment, the application module 148/180 uses the location of the morphological components (absolute, relative, or both) to interpret the image—e.g., to identify a symbol to which a morphological component should be mapped or to identify one or mathematical expressions within the image. In an embodiment, the application module 148/180 carries out this identification process heuristically. For example, the application module 148/180 may process the symbols and the locations of the morphological components to which the symbols have been mapped. For example, the application module 148/180 may map the morphological component within the bounding box 302 to a square root symbol. Thus the application module 148/180 determines that any other symbols within the bounding box 302 are to be subject to a square root operation.

In another example, the application module 148/180 disambiguates symbols heuristically. For example, the application module 148/180 determines whether a horizontal line, such as the morphological component bounded by the box 303 represents a plain dash, a fraction bar, or a minus sign based on the location of the horizontal line relative to other symbols and the size of the horizontal line compared to other symbols. For example, if the horizontal line is in line with identified mathematical variables, then the application module 148/180 determines that the horizontal line is a minus operator and populates the table accordingly. If, on the other hand, the application module 148/180 has identified mathematical variables both above and below the horizontal line, then the application module 148/180 determines that the horizontal line is a fraction bar.

In an embodiment, the application module 148/180 processes the identified symbols in a predetermined order. For example, the application module 148/180 may process all square root symbols first, then process fractions. In an embodiment, the application module 148/180 processes the morphological components that are out of line prior to processing the morphological components that are in line.

According to an embodiment, the application module 148/180 uses recursive techniques to recognize one or more parts of a mathematical expression.

In an embodiment, the application module 148/180 generates a computer readable data object or objects according to the recognized parts of the mathematical expression, where the computer readable data object or objects is/are representative of the mathematical expression.

In some embodiments, some or all of the functionality performed by the application module 148/180 is instead performed by the server application 194. For example, the image may be transmitted to the server system 162, and the server application 194 may then process the image and generate the computer readable data object or objects representative of the mathematical expression as discussed above. In other embodiments, tasks such as described above are distributed between the application module 148/180 and the server application 194.

In some embodiments, the application module 148/180 and/or the server application 194 provides mechanisms for obtaining user guidance for processing the image and/or generating the computer readable data object or objects representative of the mathematical expression. For example, the application module 148/180 and/or the server application 194 may provide GUI mechanisms for allowing a user to correct artifacts in the image, place and/or adjust bounding boxes, etc. In some embodiments, the application module 148/180 and/or the server application 194 may provide GUI mechanisms for permitting a user to identify mathematical symbols that cannot be identified by the application module 148/180 and/or the server application 194, and/or for permitting the user to override identifications made by the application module 148/180 and/or the server application 194. In some embodiments, the application module 148/180 and/or the server application 194 may provide GUI mechanisms for permitting a user to modify the interpretation made by the application module 148/180 and/or the server application 194, and/or for permitting the user to override interpretations made by the application module 148/180 and/or the server application 194.

In some embodiments, the application module 148/180 and/or the server application 194 may be configured to predict what mathematical operations the user may want to perform on the equation, and prompt the user (e.g., with GUI mechanisms) whether to perform any of the predicted operations. In some embodiments, the application module 148/180 and/or the server application 194 may be configured to utilize techniques such as described in U.S. patent application Ser. No. 13/349,351, filed on Jan. 12, 2012 (U.S. Patent Application Pub. No. 2013/0185663), which is incorporated by reference herein.

According to an embodiment, the application module 148/180 and/or the server application 194 distinguishes text from mathematical expressions in part using the fact that text tends to be alphanumeric characters in-line while mathematical expressions tend to include non-alphanumeric characters and often have characters and/or symbols that are not in line. In an embodiment, the application module 148/180 interprets the text as a set of instructions for what to do with the mathematical expression and carries out an operation on the mathematical expression in accordance with the instructions. In the example of FIG. 3A, for instance, the text 304 is interpreted to mean that the equation 301 is to be mathematically simplified.

In some embodiments, the application module 148/180 and/or the server application 194 may be configured to utilize natural language processing techniques to analyze text in the image and to determine whether the text indicates what mathematical operation(s) is/are to be performed on the equation and, if so, the mathematical operation(s) that is/are to be performed.

In some embodiments, application module 148/180 and/or the server application 194 may be configured to utilize techniques such as described in one or more of U.S. Pat. Nos. 8,589,869, 8,601,015, and/or U.S. patent application Ser. No. 12/780,685, filed on May 14, 2010, each of which is incorporated by reference herein. In some embodiments, the application module 148/180 and/or the server application 194 may be configured to transmit, via the network 158 or another network, the computer readable data object or objects representative of the mathematical expression and/or identified text from the image to a computational knowledge system such as Wolfram Alpha®, or a computational knowledge system configured to perform techniques such as described in one or more of U.S. Pat. Nos. 8,589,869, 8,601,015, and/or U.S. patent application Ser. No. 12/780, 685, or another suitable computational knowledge system. The computational knowledge system may then utilize natural language processing techniques to analyze text in the image and to determine whether the text indicates what mathematical operation(s) is/are to be performed on the equation and, if so, the mathematical operation(s) that is/are to be performed. In some embodiments, the computational knowledge system may then perform the identified mathematical operation(s) and return a result. In some embodiments, the computational knowledge system may then return an indication of the identified mathematical operation(s) that should be performed, and the application module 148/180 and/or the server application 194 may then perform the identified operation(s).

In an embodiment, the following operation is carried out using the system depicted in FIG. 1 or the system depicted in FIG. 2, or another suitable system. A computer (e.g., computer 100 or computer 154) executes the application module 148/180 and a user captures an image (e.g., a page from a math textbook) with an imaging device of or coupled to the computer (e.g., the imaging device 124 of the mobile computing device 100 or the imaging device 171 of the user computer 154). The application module 148/180 recognizes one or more mathematical expressions using one or more of the techniques described above, and then transmits the recognized mathematical expression to the server system 162. The server application 194 evaluates the expression (e.g., finds roots of a quadratic equation) and transmits the results of the evaluation (e.g., transmits the roots of the solved quadratic equation) back to the application module 148/180. The application module 148/180 then displays the results to the user on the display 116 or the display 172.

In an embodiment, the following operation is carried out by the mobile device 100 or the user computer 154. A user initiates the application module 148/180 and captures an image (e.g., a page from a math textbook) with the imaging device 124 of the mobile computing device or the imaging device 171 of the user computer 154. The application module 148/180 recognizes one or more mathematical expressions using one or more of the techniques described above. The application module 148/180 evaluates the expression (e.g., solves a quadratic equation) and displays the results of the evaluation (e.g., transmits the roots of the solved quadratic equation) to the user on the display 116 or the display 172.

In an embodiment, the following operation is carried out by the user computer 154. A user initiates the application module 148/180 and captures an image (e.g., a page from a math textbook) with the imaging device 124 of the mobile computing device or the imaging device 171 of the user computer 154. The application module 148/180 recognizes one or more mathematical expressions using one or more of the techniques described above. The application module 148/180 evaluates the expression (e.g., solves an equation utilized in a control system process) and transmits, via an output interface 173, electrical signals (either by wire or wirelessly) representing the results of the evaluation to a control system. The control system then controls some physical process, such as the operation of a power plant or manufacturing process.

Figure 4:
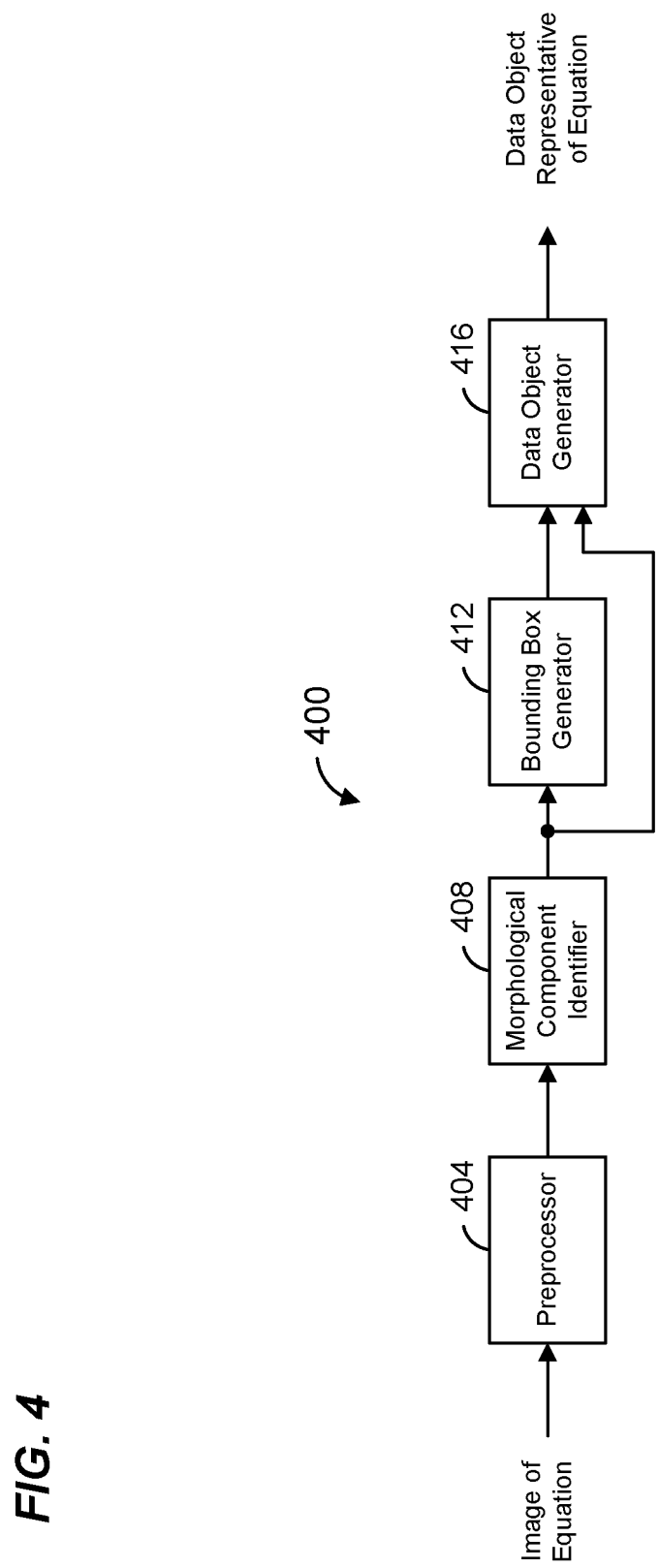
FIG. 4 is a block diagram of an example system for generating a computer readable data object corresponding to an equation depicted in an image, according to an embodiment.

FIG. 4 is a block diagram of an example system 400 for converting an image of a mathematical equation to a data object representative of the mathematical equation, according to an embodiment. The system 400 may be implemented in the application module 148/180 or the server application 194, according to various embodiments. The system 400 may be distributed among the application module 148/180 and the server application 194, according to some embodiments. The system 400 may be implemented in other suitable applications, according to other embodiments. The system 400 may be implemented at least partially in hardware, according to some embodiments.

The system 400 includes a preprocessor 404 configured to perform one or more preprocessing operations on image data in order to, for example, convert the image data to binary image data (if necessary), eliminate artifacts, etc. In some embodiments, the preprocessor 404 is omitted.

A morphological component identifier 408 is configured to identify one or more morphological components in the image data. According to an embodiment, each set of connected "black" pixels (i.e., a set of "black" pixels in which each black pixel is directly touching or indirectly touching (e.g., via one or more other black pixels that are directly touching each other) each other black pixel) constitutes a morphological component. In other embodiments, the morphological component identifier 408 is configured to identify morphological components having another suitable definition.

In some embodiments, the morphological component identifier 408 is configured to generate user interface mechanisms to permit a user to modify morphological components identified by the morphological component identifier 408. For example, the morphological component identifier 408 is configured to generate user interface mechanisms to permit a user to split a single identified morphological component into multiple different morphological components, according to an embodiment. As another example, the morphological component identifier 408 is configured to generate user interface mechanisms to permit a user to merge multiple identified morphological components into a single morphological component, according to an embodiment. As another example, the morphological component identifier 408 is configured to generate user interface mechanisms to permit a user to identify an additional morphological component that the morphological component identifier 408 did not identify, according to an embodiment.

A bounding box generator 412 is configured to define a respective bounding box around each morphological component. In an embodiment, a bounding box is defined as the smallest possible box (square or rectangle) that can contain the morphological component. The bounding box generator 412 is configured to generate bounding box information that includes data regarding the size and position (e.g., relative position or absolute position) of each bounding box, in an embodiment.

In some embodiments, the bounding box generator 412 is configured to generate user interface mechanisms to permit a user to modify bounding boxes generated by the bounding box generator 412. For example, the bounding box generator 412 is configured to generate user interface mechanisms to permit a user to change the size and/or the position of a bounding box, according to an embodiment. As another example, the bounding box generator 412 is configured to generate user interface mechanisms to permit a user to add a new bounding box, according to an embodiment.

A data object generator 416 is configured to generate a computer readable data object representative of the equation in the image using heuristics, according to an embodiment. The data object generator 416 is configured to use the bounding box information generated by the bounding box generator 412 and morphological component information generated by the morphological component identifier 408, in an embodiment. The data object generator 416 is configured to use image data (e.g., raw image data, preprocessed image data, etc.) in addition to or instead of the morphological component information, in some embodiments.

In an embodiment, the data object generator 416 is configured to identify which symbol (e.g., mathematical operator, letter, or number) each morphological component represents. The data object generator 416 is configured to create a table or other suitable data structure (e.g., stored within the memory 108 or 170) that maps each morphological component to a corresponding symbol determined by the data object generator 416 to represent the morphological component, in an embodiment. The data object generator 416 is configured to generate the data object using the symbols that were determined to map to morphological components.

The data object output by the object generator 416 may be in a format computable by the computational application discussed above with respect to FIGS. 1 and 2, in an embodiment. For example, in an embodiment, the data object is in the form of the Wolfram Language™, which Mathematica® and the Wolfram Cloud™ are configured to evaluate. As another example, in an embodiment, the data object is in a syntax specified by, and capable of being evaluated by, a spreadsheet application (e.g., includes keywords recognized by the spreadsheet application as particular functions to be performed by the spreadsheet application). In some embodiments, the data object includes software code in a programming language. In some embodiments, the programming language is a symbolic programming language. In some embodiments, the data object is in a syntax specified by, and capable of being evaluated by, a computational application (e.g., includes keywords recognized by the computational application as particular functions to be performed by the computational application).

In an embodiment, the data object generator 416 is configured to generate a computer readable data object that is syntactically correct (e.g., the generated computer readable data object is formatted such that the computer readable data object is in a correct syntax recognized by an application such as the computational application discussed above).

In some embodiments, the data object generator 416 is configured to generate user interface mechanisms to permit a user to modify one or more of i) a symbol to which the data object generator 416 mapped to a morphological symbol, and/or ii) the data object generated by the bounding box generator 412.

Figure 5:
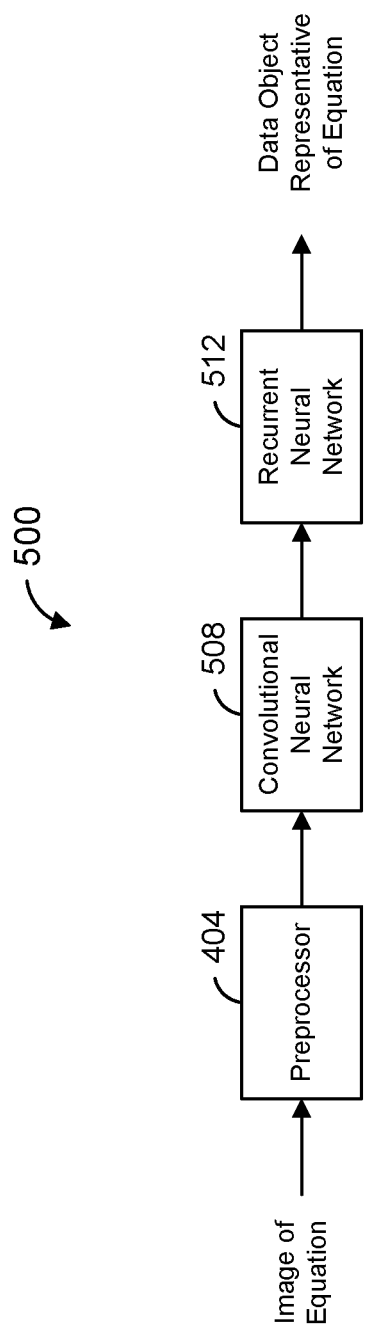
FIG. 5 is a block diagram of another example system for generating a computer readable data object corresponding to an equation depicted in an image, according to another embodiment.

FIG. 5 is a block diagram of another example system 500 for converting an image of a mathematical equation to a data object representative of the mathematical equation, according to an embodiment. The system 500 may be implemented in the application module 148/180 or the server application 194, according to various embodiments. The system 500 may be distributed among the application module 148/180 and the server application 194, according to some embodiments. The system 500 may be implemented in other suitable applications, according to other embodiments. The system 500 may be implemented at least partially in hardware, according to some embodiments.

The system 500 includes the preprocessor 404 discussed above with reference to FIG. 4, in an embodiment. In some embodiments, the preprocessor 404 is omitted.

The system 500 also includes a first neural network 508 (e.g., a convolutional neural network or another suitable neural network, in various embodiments) configured to analyze image data and to identify morphological components in the image. The first neural network 508 may be trained with training data that includes and/or simulates one or more of i) hand drawn mathematical equations optionally including hand written and/or printed instructions regarding how to analyze the equations (e.g., "solve", "simplify", "factor", etc.), ii) scans of papers having printed thereon equations and optionally instructions regarding how to analyze the equations, iii) scans of pages bound in books having printed thereon equations and optionally instructions regarding how to analyze the equations, etc. In some embodiments, the first neural network 508 may be trained to recognize alphanumeric characters, mathematical symbols, etc. In some embodiments, the first neural network 508 is configured to identify image elements relevant to equations, text associated with equations (e.g., textual instructions regarding an analysis to be performed on an equation), etc.

In some embodiments, the first neural network 508 is configured to perform semantic segmentation.

A second neural network 512 is configured to generate a computer readable data object representative of the equation in the image using the output of the first neural network 508. In an embodiment, the second neural network 512 includes a recurrent neural network. In an embodiment, the second neural network 512 includes a recursive neural network. In another embodiment, the second neural network 512 includes a suitable neural network different than a recurrent neural network. In an embodiment, the second neural network 512 is configured to generate a computer readable data object that is syntactically correct (e.g., the generated computer readable data object is formatted such that the computer readable data object is in a correct syntax recognized by an application such as the computational application discussed above).

In an embodiment, the second neural network 512 is configured to generate an output in a particular predetermined format. For example, with regard to mathematical equations, the second neural network 512 is configured to generate the output such that the components of the equation are arranged in a particular order designed to facilitate interpretation of the components of the equation, according to an embodiment. As an illustrative example, the second neural network 512 is configured to generate the output such that the components of a mathematical equation are arranged according to Polish notation (sometimes referred to as "prefix notation"), according to an embodiment. As another illustrative example, the second neural network 512 is configured to generate the output such that the components of the mathematical equation are arranged according to reverse Polish notation (sometimes referred to as "postfix notation"), according to an embodiment. In other embodiments, the second neural network 512 is configured to generate the output such that the components of the mathematical equation are arranged according to other suitable syntaxes for describing mathematical expressions, according to an embodiment.

In some embodiments, a formatting module (not shown in FIG. 5) separate from the second neural network 512 is configured to receive an output from the second neural network 512 and to format the output in the particular predetermined format discussed above.

In some embodiments, techniques described above may be combined. For example, in an embodiment, the first neural network 508 (FIG. 5) is utilized with the data object generator 416 (FIG. 4). As another example, the morphological component identifier 404 (FIG. 4) and the bounding box generator 412 (FIG. 4) are utilized with the second neural network 512 (FIG. 5), according to an embodiment.

The system 400 and the system 500 are configured to process objects, depicted in images, having a plurality of levels in a hierarchy and/or in a multi-dimensional coordinate space, according to some embodiments. For instance, at least some mathematical expressions depicted in images are examples of objects having a plurality of levels in a hierarchy. For example, in an expression having nested brackets including a first set of brackets within a second set of brackets, a hierarchy in the expression may include a first level within the first set of brackets, a second level outside of the first set of brackets and within the second set of brackets, and a third level outside the second set of brackets. In this example and according to an embodiment, the second level is above the first level in the hierarchy, and the third level is above the second level in the hierarchy.

Figures 6A, 6B:
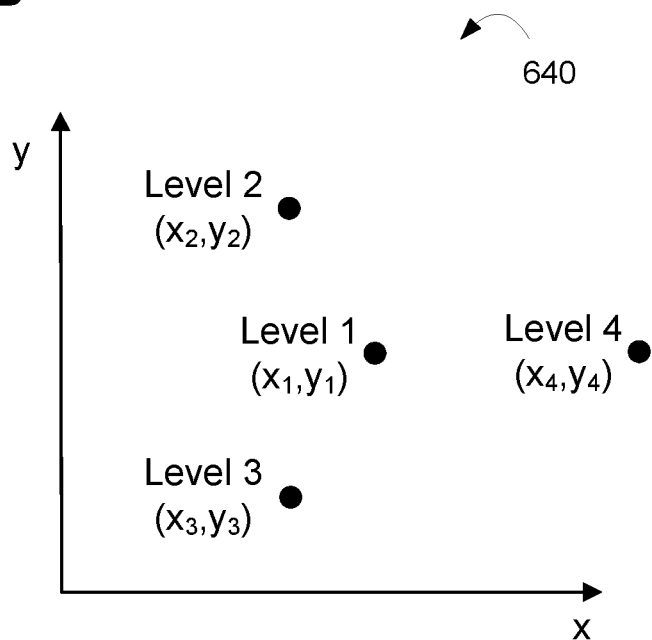
FIG. 6A illustrates an example mathematical expression that can be analyzed according to or by example methods and/or example systems described herein, in various embodiments.
FIG. 6B is a diagram illustrating an example multi-dimensional structure corresponding to the expression of FIG. 6A, according to an embodiment.

As another illustrative example, FIG. 6A illustrates an example mathematical expression 600 that the system 400 and/or the system 500 are configured to analyze, in various embodiments. The expression 600 includes a first area 604 between an integral sign 608 and a symbol 612. The first area 604 corresponds to a first level associated with a first coordinate pair. The expression 600 includes a second area 616 corresponding to an upper limit of the integral. The second area 616 corresponds to a second level associated with a second coordinate pair. The expression 600 includes a third area 620 corresponding to a lower limit of the integral. The third area 620 corresponds to a third level associated with a third coordinate pair. The expression 600 also includes a fourth area outside of the integral. The fourth area corresponds to a fourth level associated with a fourth coordinate pair.

FIG. 6B is a diagram illustrating an example structure 640 corresponding to the expression 600 of FIG. 6A, according to an embodiment. In the structure 640, the first level is associated with a first coordinate pair (x1,y1), the second level is associated with a second coordinate pair (x2,y2), the third level is associated with a third coordinate pair (x3,y3), and the fourth level is associated with a fourth coordinate pair (x4,y4). In an embodiment, x2 equals x3, and y1 equals y4.

The system 400 and the system 500 are configured to generate a computer readable data object having a hierarchical and/or multi-dimensional structure that reflects the object, depicted in the image, that has a plurality of levels in a hierarchy and/or in a multi-dimensional coordinate space, according to some embodiments.

Although the techniques and systems described above were discussed in the context of analyzing mathematical equations, similar techniques and systems may be utilized to convert images of other types of equations to computer readable objects, such as chemical equations, according to some embodiments. Additionally, although techniques and systems described above were discussed in the context of analyzing mathematical equations, similar techniques and systems may be utilized to convert images of other types of objects having a plurality of levels in a hierarchy and/or in a multi-dimensional coordinate space (e.g., chemical diagrams) to computer readable objects, according to some embodiments.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in one or more tangible, non-transitory computer readable media such as a magnetic disk, an optical disk, a RAM, a ROM, a flash memory, a memory of a processor, a magnetic tape, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device, etc.

While the present disclosure has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the disclosure.

What is claimed is:

1. A method of generating a computer readable data object corresponding to an equation depicted in an image, the method comprising:
receiving, at one or more processors, image data corresponding to an image depicting an equation;
processing, at one or more processors, the image data to identify a plurality of morphological components corresponding to the equation depicted in the image, wherein processing the image data to identify the plurality of morphological components includes
processing one or more objects, depicted in the image, having a plurality of levels in a hierarchy or in a multidimensional coordinate space,
generating, based on the one or more objects having a plurality of levels in a hierarchy or in a multidimensional coordinate space, a plurality of bounding boxes corresponding to the plurality of morphological components,
generating user interface mechanisms to permit a user to modify a size and/or position of one or more of the bounding boxes, and
modifying one or more of the bounding boxes in response to user input received via the user interface mechanisms; and
generating, at one or more processors, the computer readable data object using (i) the plurality of morphological components and (ii) the plurality of bounding boxes, wherein the computer readable data object (i) is in a defined syntax computable by a computational application and (ii) has a hierarchical or multidimensional structure corresponding to the one or more objects having a plurality of levels in a hierarchy or in a multidimensional coordinate space.

2. The method of claim 1, wherein generating the computer readable data object includes using heuristics to identify symbols corresponding to morphological components among the plurality of morphological components.

3. The method of claim 1, wherein processing the image data to identify the plurality of morphological components comprises:
   using a neural network to process the image data to identify alphanumeric characters and mathematical or scientific symbols.

4. The method of claim 3, wherein:
   the neural network is a first neural network; and
   generating the computer readable data object includes using a second neural network to process identified alphanumeric characters and mathematical or scientific symbols.

5. The method of claim 4, wherein:
   using the first neural network to process the image data comprises using a convolutional neural network; and
   using the second neural network to process the alphanumeric characters and mathematical or scientific symbols comprises using a recurrent neural network.

6. The method of claim 4, further comprising:
   outputting, by the second neural network, elements of the equation in an order corresponding to a predefined syntax.

7. The method of claim 6, wherein the predefined syntax is one of i) Polish notation or ii) reverse Polish notation.

8. The method of claim 1, wherein:
   the image depicts text that instructs an operation to be performed on the equation; and
   generating the computer readable data object using the plurality of morphological components comprises generating the computer readable data object such that the computational application will perform the operation on the equation when the computational application evaluates the computer readable data object.

9. The method of claim 1, wherein the equation is one of i) a mathematical equation, or ii) a chemical equation.

10. The method of claim 1, further comprising:
    generating, at one or more processors, user interface mechanisms to permit a user to split a bounding box.

11. The method of claim 1, further comprising:
    generating, at one or more processors, user interface mechanisms to permit a user to merge multiple bounding boxes.

12. The method of claim 1, wherein:
    the plurality of bounding boxes are smallest boxes that contain the respective morphological components;
    generating the computer readable data object comprises:
    when a first bounding box corresponding to a first symbol also includes one or more second symbols corresponding to one or more second bounding boxes, determining, at one or more processors, that the one or more second symbols correspond to one or more operands of a mathematical operation corresponding to the first symbol.

13. A system for generating a computer readable data object corresponding to an equation depicted in an image, the system comprising:
    one or more processors; and
    one or more memories coupled to the one or more processors, the one or more memories storing machine readable instructions that, when executed by the one or more processors, cause the one or more processors to:
    receive image data corresponding to an image depicting an equation;
    process the image data to identify a plurality of morphological components corresponding to the equation depicted in the image, wherein processing the image data to identify the plurality of morphological components includes
    processing one or more objects, depicted in the image, having a plurality of levels in a hierarchy or in a multidimensional coordinate space,
    generating, based on the one or more objects having a plurality of levels in a hierarchy or in a multidimensional coordinate space, a plurality of bounding boxes corresponding to the plurality of morphological components,
    generating user interface mechanisms to permit a user to modify a size and/or position of one or more of the bounding boxes, and
    modifying one or more of the bounding boxes in response to user input received via the user interface mechanisms; and
    generate the computer readable data object using (i) the plurality of morphological components and (ii) the plurality of bounding boxes, wherein the computer readable data object (i) is in a defined syntax computable by a computational application and (ii) has a hierarchical or multidimensional structure corresponding to the one or more objects having a plurality of levels in a hierarchy or in a multidimensional coordinate space.

14. The system of claim 13, wherein the one or more memories further store machine readable instructions that, when executed by the one or more processors, cause the one or more processors to use heuristics to identify symbols corresponding to morphological components among the plurality of morphological components as part of generating the computer readable data object.

15. The system of claim 13, wherein the one or more memories further store machine readable instructions that, when executed by the one or more processors, cause the one or more processors to process to:
    use a neural network to process the image data to identify alphanumeric characters and mathematical or scientific symbols.

16. The system of claim 15, wherein:
    the neural network is a first neural network; and
    the one or more memories further store machine readable instructions that, when executed by the one or more processors, cause the one or more processors to use a second neural network to process the identified alphanumeric characters and mathematical or scientific symbols to generate the computer readable data object.

17. The system of claim 16, wherein:
    the first neural network includes a convolutional neural network; and
    the second neural network includes a recurrent neural network.

18. The system of claim 16, where the one or more memories further store machine readable instructions that, when executed by the one or more processors, cause the one or more processors to:
    output, by the second neural network, elements of the equation in an order corresponding to a predefined syntax.

19. The system of claim 18, wherein the predefined syntax is one of i) Polish notation or ii) reverse Polish notation.

20. The system of claim 13, wherein:
    the image depicts text that instructs an operation to be performed on the equation; and
    the one or more memories further store machine readable instructions that, when executed by the one or more processors, cause the one or more processors to generate the computer readable data object such that the computational application will perform the operation on the equation when the computational application evaluates the computer readable data object.

21. The system of claim 13, wherein the equation is one of i) a mathematical equation, or ii) a chemical equation.

22. The system of claim 13, wherein the one or more memories further store machine readable instructions that, when executed by the one or more processors, cause the one or more processors to process to:
  generate user interface mechanisms to permit a user to split a bounding box.

23. The system of claim 13, wherein the one or more memories further store machine readable instructions that, when executed by the one or more processors, cause the one or more processors to process to:
  generate user interface mechanisms to permit a user to merge multiple bounding boxes.

24. The system of claim 13, wherein:
  the plurality of bounding boxes are smallest boxes that contain the respective morphological components;
  the one or more memories further store machine readable instructions that, when executed by the one or more processors, cause the one or more processors to process to: when a first bounding box corresponding to a first symbol also includes one or more second symbols corresponding to one or more second bounding boxes, determine that the one or more second symbols correspond to one or more operands of a mathematical operation corresponding to the first symbol.

* * * * *